US012705231B2

(12) United States Patent
Sharma et al.

(10) Patent No.: US 12,705,231 B2
(45) Date of Patent: Aug. 11, 2026

(54) CHATBOT ASSISTANT POWERED BY ARTIFICIAL INTELLIGENCE FOR TROUBLESHOOTING ISSUES BASED ON HISTORICAL RESOLUTION DATA

(71) Applicant: FIDELITY INFORMATION SERVICES, LLC, Jacksonville, FL (US)

(72) Inventors: Ashish Sharma, Punjab (IN); Pulika Arora, Punjab (IN); Vivek Painuly, Punjab (IN); Pushpraj Sharma, Madhyapradesh (IN)

(73) Assignee: FIDELITY INFORMATION SERVICES, LLC, Jacksonville, FL (US)

( * ) Notice: Subject to any disclaimer, the term of this patent is extended or adjusted under 35 U.S.C. 154(b) by 95 days.

(21) Appl. No.: 18/430,469

(22) Filed: Feb. 1, 2024

(65) Prior Publication Data

US 2025/0209064 A1 Jun. 26, 2025

(30) Foreign Application Priority Data

Dec. 20, 2023 (IN) ............................ 202311087191

(51) Int. Cl.
*G06F 16/242* (2019.01)
*G06F 7/06* (2006.01)
(Continued)

(52) U.S. Cl.
CPC .............. *G06F 16/243* (2019.01); *G06F 7/06* (2013.01); *G06F 16/258* (2019.01); *G06F 40/35* (2020.01); *H04L 51/02* (2013.01)

(58) Field of Classification Search
None
See application file for complete search history.

(56) References Cited

U.S. PATENT DOCUMENTS

2017/0262449 A1* 9/2017 Venkataraman ....... G06N 20/00
2018/0121808 A1 5/2018 Ramakrishna et al.
(Continued)

OTHER PUBLICATIONS

Vegesna et al. "Ontology based chatbot (for e-commerce website)." International Journal of Computer Applications 179.14 (2018): 51-55. [Retrieved on Jan. 5, 2025 (Jan. 1, 2025) from https://www.ijcaonline.org/archives/volumel79/numberl4/vegesna-2018-ijca-916215.pdf]. entire document.
(Continued)

*Primary Examiner* — Antim G Shah
(74) *Attorney, Agent, or Firm* — Finnegan, Henderson, Farabow, Garrett & Dunner, LLP

(57) ABSTRACT

Systems and methods for troubleshooting issues based on historical resolution data. In one implementation, the disclosed system includes at least one processor and at least one non-transitory memory containing software code configured to cause the processor to: receive source data from a plurality of data sources; extract a plurality of keywords from the source data; store the plurality of keywords in a database; receive a natural-language user issue input from a chatbot; determine whether the received user input matches the keywords in the database, wherein a comparison result is inputted into a trained model; input the user issue input into the trained model; in response to the determining, transmit the resolution from the trained model to the chatbot.

20 Claims, 6 Drawing Sheets

(51) Int. Cl.

| | |
|---|---|
| ***G06F 16/25*** | (2019.01) |
| ***G06F 40/35*** | (2020.01) |
| ***H04L 51/02*** | (2022.01) |

(56) References Cited

U.S. PATENT DOCUMENTS

| | | | | |
|---|---|---|---|---|
| 2019/0102078 | A1 | 4/2019 | Bhatt et al. | |
| 2019/0205837 | A1 | 7/2019 | Tuli et al. | |
| 2022/0171641 | A1 | 6/2022 | Pichiliani et al. | |
| 2022/0309250 | A1 | 9/2022 | Das et al. | |
| 2023/0169328 | A1* | 6/2023 | Haptonstahl ............. | G06N 3/08 706/15 |
| 2023/0259821 | A1 | 8/2023 | Travalini et al. | |

OTHER PUBLICATIONS

Azevedo et al. "A Novel Methodology for Developing Troubleshooting Chatbots Applied to ATM Technical Maintenance Support." Applied Sciences 13.11 (2023): 6777. Jun. 2, 2023 (Jun. 2, 2023).

International Search Report and Written Opinion of the International Searching Authority, for International App. No. PCT/US2024/057243, dated Jan. 5, 2025, 16 pages.

* cited by examiner

300

CHATBOT ASSISTANT POWERED BY ARTIFICIAL INTELLIGENCE FOR TROUBLESHOOTING ISSUES BASED ON HISTORICAL RESOLUTION DATA

FIELD OF THE DISCLOSURE

The disclosed embodiments generally relate to systems and methods for a chatbot assistant powered by artificial intelligence for troubleshooting issues based on historical resolution data.

BACKGROUND

Software projects within an organization inevitably have ongoing preproduction and environment-related issues that impact performance, reliability, and functionality of software applications. Non-limiting examples of software issues relate to compatibility, dependency, networks, connectivity, resource constraints, environmental variability, security, data storage, retrieval, and scalability. Troubleshooting and resolving these issues generally requires technical support.

Troubleshooting issues involves identifying, analyzing, or solving problems that occur in a system, application, device, or process. Further, troubleshooting issues may involve diagnosing the cause of a system's software malfunction and implementing solutions to restore the system to normal operation. By way of non-limiting example, troubleshooting issues may involve addressing malfunctions, glitches, bugs, crashes, performance issues, security vulnerabilities, errors, or other issues that impede normal operation of a system. Further, troubleshooting issues may include a series of diagnostic steps and problem solving techniques aimed at restoring the system to its intended functionality.

Current systems and methods for troubleshooting issues involve issue tracking systems, debugging, collaborative discussions, root cause analysis, or reading through documentation. With current systems and methods, teams may have to search through many sources (e.g., Rally, Outlook, MS Teams chats, Jira) to find a resolution to their issue. These current systems and methods for troubleshooting are time-consuming, inefficient, and not cost effective. Further, the time involved in troubleshooting issues may impact the regression cycle deadline. In addition, many configuration and non-technical issues are recurring and often require the same solution by different sets of people. Distributed teams spread across many locations may result in efforts duplication to resolve ongoing technical and configuration issues. Searching through already available solutions may be burdensome and time consuming, especially when enterprise products are developed at large scale. Further, there is a high probability one issue resolution may already exist somewhere in various platforms (e.g., Jira, Rally, Outlook).

As software systems become more complex, distributed, and interconnected, improved systems and methods for troubleshooting issues are needed.

SUMMARY

Disclosed embodiments address the limitations of current systems and methods of troubleshooting issues, and provide an efficient, time-saving, and cost-effective technical solution. For example, disclosed embodiments address potential changes in project complexity over time (e.g., code expansion, releases), cost and client satisfaction (e.g., lack of automation, speed of delivery), cross-team collaboration (e.g., resource identification, missing information), and redundant manual effort (e.g., reoccurring defects, manual intervention).

Disclosed embodiments comprise systems and methods for implementing a chatbot assistant for troubleshooting issues based on artificial intelligence. Current chatbot assistants provide instant responses to a user related to a number of applications such as customer service, e-commerce, and information retrieval. However, current chatbot assistants have limited understanding of context, difficulty comprehending natural language nuances, limited personalization, integration challenges, struggle with maintaining coherent conversations, and depend on predefined responses. Disclosed embodiments address the aforementioned technical challenges and involve a chatbot configured to troubleshoot technical issues. No such chatbot exists in the marketplace that provides smart resolutions to user technical issues regarding internal software. Further, traditional systems for troubleshooting issues are based on data from one data source. Disclosed embodiments improve accuracy of resolutions by using data from multiple data sources.

Disclosed embodiments involve a chatbot designed in such a way that recurring software issue information is fed into a data model through various data sources (e.g., Rally, Outlook, Teams). User may input issues into the chatbot, where the chatbot displays resolutions to the issues based on the historical resolution data present in a trained data model. Historical resolution data refers to information or data that documents the outcome or solution of past issues or problems. For example, historical resolution data may include information about how user issues were resolved or addressed in the past.

Disclosed embodiments may be applied across any sector (e.g., banking, healthcare, advertisement), where data involves recurring issue solutions. Non-limiting examples of users may include team leaders and developers responsible for project release as well as product and support representatives seeking resolutions for software issues. New team members who need to troubleshoot issues quickly and gain knowledge may also benefit from disclosed embodiments. The solution of the present disclosure is easy to integrate within any team and is helpful for internal defect resolution. Further, the solution of the present disclosure enhances segregation of duties for users and presents a quick and accurate resolution to user issues.

One aspect of the present disclosure is directed to a system for troubleshooting issues based on historical resolution data. The system includes at least one processor and at least one non-transitory memory storing instructions to perform operations when executed by the at least one processor. The operations include receiving source data from a plurality of data sources; extracting a plurality of keywords from the source data; storing the plurality of keywords in a database; receiving a natural-language user issue input from a chatbot; determining, based on a comparison of the received user issue input to the stored keywords, whether the received user input matches the keywords in the database, wherein a comparison result is inputted into a trained model; inputting the user issue input into the trained model, wherein the trained model is based on a previous pair of user issue inputs mapped to the resolutions and the comparison result; and in response to the determining, transmitting the resolution from the trained model to the chatbot.

Another aspect of the present disclosure is directed to data sources comprising one or more of mail data, ticket data, project management data, or incident report data. In various embodiments, the data sources are synced with one or more cloud systems or software communication systems.

In some embodiments, the data source comprises images, the processor is further configured to extract image source data with a cognitive vision tool, and the processor is further configured to store the image source data in the database.

In some embodiments, the processor is further configured to convert the source data to JSON format. In various embodiments, the previous pair of user issue inputs mapped to resolutions is sorted according to at least one of a sorting metric, user feedback, or manual sorting. In various embodiments, the trained model is configured to map at least one of a project name or the keywords to a category. In other embodiments, the processor is further configured to remove undesired source data.

Another aspect of the present disclosure is directed to a method for troubleshooting issues based on historical resolution data. The method includes receiving source data from a plurality of data sources; extracting a plurality of keywords from the source data; storing the plurality of keywords in a database; receiving a natural-language user issue input from a chatbot; determining, based on a comparison of the received user issue input to the stored keywords, whether the received user input matches the keywords in the database, wherein a comparison result is inputted into a trained model; inputting the user issue input into the trained model, wherein the trained model is based on a previous pair of user issue inputs mapped to the resolutions and the comparison result; and in response to the determining, transmitting the resolution from the trained model to the chatbot.

Other systems and methods are also discussed herein. Disclosed embodiments may include any of the above aspects alone or in combination with one or more aspects, whether implemented as a method, by at least one processor, and/or stored as executable instructions on non-transitory computer readable media.

DETAILED DESCRIPTION

Figure 1:
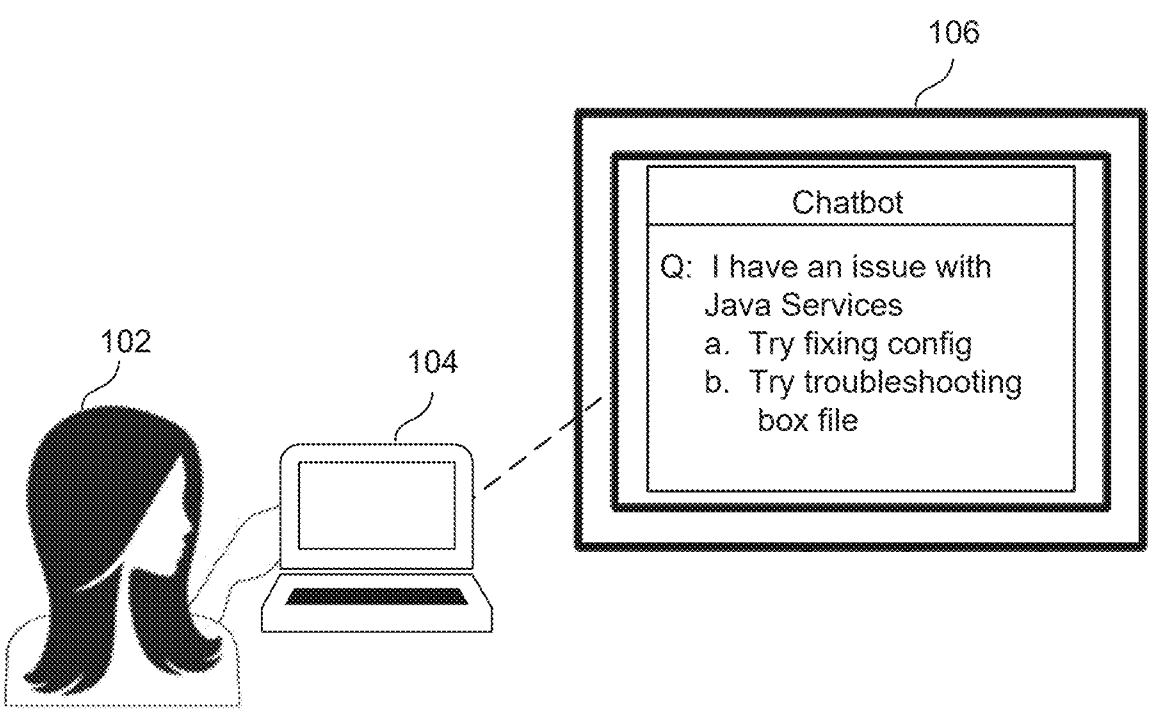
FIG. 1 depicts a user interacting with exemplary chatbot, consistent with disclosed embodiments.

The following detailed description refers to the accompanying drawings.

Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for troubleshooting issues based on historical resolution data. The system includes at least one processor and at least one non-transitory memory storing instructions to perform operations when executed by the at least one processor. The operations include receiving source data from a plurality of data sources; extracting a plurality of keywords from the source data; storing the plurality of keywords in a database; receiving a natural-language user issue input from a chatbot; determining, based on a comparison of the received user issue input to the stored keywords, whether the received user input matches the keywords in the database, wherein a comparison result is inputted into a trained model; inputting the user issue input into the trained model, wherein the trained model is based on a previous pair of user issue inputs mapped to the resolutions and the comparison result; and in response to the determining, transmitting the resolution from the trained model to the chatbot.

Referring to FIG. 1A, an exemplary diagram 100 illustrating an end-user 102 using a user device 104, wherein the user device 104 displays a chatbot 106 is shown. End-user 102 may use chatbot 106 when faced with a software issue. In exemplary FIG. 1, an end-user 102 inputs information into chatbot 106 (e.g., "I have an issue with Java services") via user device 104. User device 104 may display chatbot 106. Chatbot 106 is a front-end for accessing data and thus other front ends may be used. In response to the end-user's input, chatbot 106 may communicate with processor (e.g., processor 204 in FIG. 2) and display resolutions (e.g., "a. Try fixing config b. Try troubleshooting box file") related to user input. Resolutions from chatbot 106, in some embodiments, may help end-user troubleshoot an issue input.

End-user 102, in some embodiments, may be an operator of user device 104 or chatbot 106. For example, end-user 102 may be a person such as an app developer, new employee, team leader, product representative, support representative, or anyone who interacts or communicates with chatbot 106. End-user 102, in some embodiments, may be a computer, software system, software application, or website that is compatible, interacts, or communicates with chatbot 106. End-user, in some embodiments, may input a user issue input into chatbot 106. In some embodiments, user issue input may include problem descriptions, issues, feature requests, or suggestions for improvement. Input (e.g., user issue input) from end-user into chatbot 106 may be in natural language. Natural-language refers to human-language (e.g., English, French, Chinese, Spanish). As used herein, end-user 102 may also be referred to as user.

User device 104, in some embodiments, may be any hardware or software component, device, gadget, or tool that is utilized by user 102 to interact with chatbot 106. Stated another way, user device 104 may be an interface for user 102 and chatbot 106. User device 104 may involve one or more computers, laptops, tablets, smartphones, or other devices that display information. User device 104 may be operated by users 102 to perform various tasks, access content, communicate with, interact with, provide feedback to, input information into, send information to, and display information from chatbot 106. For example, user 102 may input information (e.g., user issue input) into chatbot 106, in some embodiments, via typing text, selecting options, clicking buttons, or using voice commands. User device 104, in some embodiments, may display chatbot 106 information such as text, images, multimedia, menus, buttons, or verbally communicate information to user 102. Further, user device 104 may involve a user interface that facilitates communication with chatbot 106. For example, user interface may be a web page, mobile app, or application interface configured to communicate with chatbot 106 and user device. User device 104 may communicate with chatbot 106 using communication protocols such as HTTP.

Figure 2:
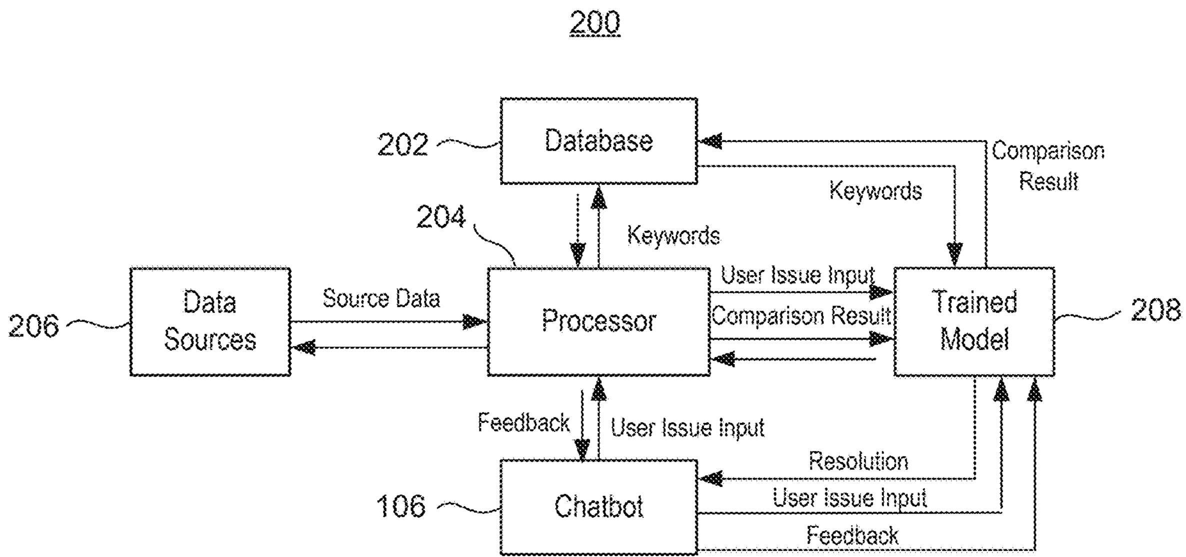
FIG. 2 depicts an exemplary system for troubleshooting issues based on historical resolution data, consistent with disclosed embodiments.

Chatbot 106, in some embodiments enables communication between user 102 and processor (processor 204 in FIG. 2). For example, chatbot 106 may be a chatbot or conversational agent designed to engage in natural-language conversations with user 102. Further, chatbot 106 need not be a chatbot, but could be any other system or method of receiving input from and providing output to a human being, such as a chatbot, an automated system, an intelligent agent, a conversation tree-based system, or the like.

Chatbot 106, in some embodiments, may be designed to simulate conversation with users 102, via text-based or voice-based communication. Chatbot 106, in some embodiments, may involve a voice activated system, an intelligent system, a user interface, a virtual assistant, a messaging application, or a customer support system. For example, chatbot 106 may involve systems such as Siri, Alexa, Google Assistant, Cortana, Facebook Messenger, WhatsApp, Microsoft Teams, or WeChat. Chatbot 106 may be configured to communicate with processor 204, trained model 208, data sources 206, and database 202. Further, chatbot 106, in some embodiments, may be implemented in applications, websites, or messaging platforms to facilitate real-time communication between user 102 and systems such as chatbots or virtual assistants.

Chatbot 106 may involve a user interface, natural language processing (NPL), rule-based systems, machine learning models, dialog management, a database, response generation, user authentication, security, context awareness, task automation, feedback, integration with platforms, updates, analytics, and reporting. For example, chatbot 106 may receive user input through an interface, use NPL to analyze and understand a natural-language user input, use an intent classifier to determine user's intent based on the input, map the input to a corresponding resolution, retrieve information from a database, manage conversation with user, generate a response based on retrieved information, integrate with other systems, verify user identity, and incorporate a user feedback mechanism so users can provide feedback on resolutions. Natural-language refers to human language in a way similar to how people communicate. For example, user may input into chatbot 106 "I am having an issue with Java." In some embodiments, chatbot 106 may involve a graphical user interface (GUI), a command line interface (CLI), or a menu-driven user interface, Further, chatbot 106 may include a user input area where user 102 inputs questions, commands, or statements in natural language.

Chatbot 106, in some embodiments, may be configured to receive and send data in real-time. For example, user 102 may input user issue input into chatbot 106 (e.g., via user device 104). Chatbot 106 may receive a natural-language user issue input from user 102. User issue input, as described elsewhere herein, may involve problem descriptions, issues, feature requests, or suggestions for improvement. User issue input may be in natural language. Natural-language may refer to human-language (e.g., English, French, Chinese, Spanish). For example, in one embodiment, chatbot 106 may receive input information (e.g., user issue input) from user 102 and send information to processor 204 to perform tasks and operations based on user issue input. Chatbot 106 may receive information directly from user 102 or via user device 104. In some embodiments, chatbot 106 may display resolution information from trained model 208.

Chatbot 106, in some embodiments, may display information such as user issue input, chatbot responses, and chat history. For example, chatbot 106 may display chat history of messages between user 102 and chatbot 106, allowing user 102 to track the conversation. Chatbot 106 may involve a chatbot response area, which in some embodiments, may display responses to user inputs. Chatbot 106 may involve user identification, such as an indication of the user's identity such as username or profile picture. Chatbot 106 may include a bot status or indicators, displaying the status of the chatbot 106 such as whether it is currently typing or processing the user's input. Chatbot 106 may involve a menu or command options. For example, chatbot 106 may involve buttons, quick reply options, or a menu that user 102 interacts with to navigate or trigger specific actions. Chatbot 106, in some embodiments, may involve media sharing options, where users have the option to share media such as images, files, or links. Chatbot 106, in some embodiments, may involve notifications including messages, alerts, or important information. Further, chatbot 106 may be used in various environments and industries to facilitate communication and interaction with user 102. Non-limiting examples of environments where chatbot 106 may be employed in include healthcare, finance and banking, human resources, education, travel and hospitality, entertainment, retail, internal business processes, or legal services.

FIG. 2 depicts exemplary system 200. System 200 comprises, in some embodiments, data sources 206, processor 204, database 202, trained model 208, and chatbot 106. Processor 204, in some embodiments, may include any physical device or group of devices having electric circuitry that performs a logic operation on an input or inputs. Processor 204 may comprise one or more electronic processors used to process instructions inside of a computer or other electronic system. For example, a processor or at least one processor may include one or more integrated circuits (IC), including an application-specific integrated circuit (ASIC), a microchip, a microcontroller, a microprocessor, all or part of a central processing unit (CPU), a graphics processing unit (GPU), a digital signal processor (DSP), a field-programmable gate array (FPGA), a neural processing unit (NPUs), an AI accelerator, a server, a virtual server, a virtual computing instance (e.g., a virtual machine or a container), or other circuits suitable for executing instructions of performing logic operations. The instructions executed by at least one processor 204 may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor 204 may include more than one processor. Each processor 204 may have a similar construction, or the processors 204 may be of differing constructions that are electrically connected or disconnected from each other. For example, the processors 204 may be separate circuits or integrated in a single circuit. When more than one processor 204 is used, the processors 204 may be configured to operate independently or collaboratively and may be co-located or located remotely from each other. The processor 204 may be coupled electrically, magnetically, optically, acoustically, mechanically or by other means that permit them to interact. For example, processor 204 may be a processor created by one or more of Intel, AMD, Nvidia, Qualcomm, Apple, or IBM. Some disclosed embodiments may be software-based and may not require any specified hardware support.

Processor 204 may be configured to receive data from sources. For example, processor 204, in some embodiments, may receive data from input devices (e.g., user device), memory (e.g., RAM), databases, models, storage devices (e.g., SSDs), user interfaces, or network interfaces (e.g., Wi-Fi). Further, in some embodiments, processor 204 may receive source data from data sources 206 (e.g., as described below with respect to at least FIG. 4). Source data refers to the information stored in data sources 206, as described elsewhere herein.

In some embodiments, processor 204 may be configured to convert data to various data formats. Convert refers to changing from one form or state to another. For example, processor 204 may convert source data, meaning processor 204 may be configured to change the structure or encoding of the source data from one structure or format to another. Processor 204, may convert source data to a different data format, allowing source data to be compatible with different software applications, devices, or systems. For example, processor 204 may convert data into different image formats (e.g., JPEG, PNG, BMP, GIF), audio formats (e.g., PCM, MP3, WAV), video formats (e.g., MPEG), text formats (e.g., HTML, XML, JSON), document formats (e.g., PDF, DOCX, XLSX), database formats (e.g., SQL, NoSQL), compressed formats (e.g., ZIP, RAR), or according to different network protocols (e.g., HTTP, UDP, TCP/IP, FTP). For example, in one embodiment, processor 204 may convert source data into JSON format. JSON format refers to a data format commonly used for transmitting data between a server and a web application. For example, data in JSON format may include a collection of name and value pairs (e.g., object, hash table, keyed list, or associative array) and an ordered list of values (e.g., array, vector, list, or sequence). JSON format may be organized in a hierarchical format, allowing for nested structures. Data in JSON format may be used in many contexts, including web services, APIs, and data storage. For example, processor 204 converting the source data to JSON format may involve reformatting the source data to be conducive with the syntax and structure of JSON format. This converting may involve transforming the data into value pairs and implementing a set of rules for defining objects, arrays, and values. Converting the source data to JSON format allows the source data to be interpreted, transmitted, stored, manipulated, and processed by a variety of programming languages and platforms.

In some embodiments, processor 204 removes undesired data (e.g., source data). Removing undesired source data refers to identifying, eliminating, and/or minimizing unnecessary, irrelevant, or potentially harmful source data. Removing undesired data may also be referred to as cleansing data elsewhere herein. For example, processor 204 may remove unnecessary source data by filtering or cleansing data (as described elsewhere with respect to at least FIG. 6). Undesired source data may come from data sources 206, as described elsewhere herein. Undesired source data may be irrelevant, inaccurate, incomplete, outdated, redundant, poor quality or otherwise not useful. In some embodiments, processor 204 may determine data is undesired. For example, processor 204 may identify undesired data based on data validation rules, thresholds, limits, pattern recognition, duplicate recognition, contextual analysis, temporal analysis, or criteria defined by an administrator. Processor 204 may remove undesired source data, ensuring higher accuracy and reliability of source data. For example, processor 204 may implement filtering algorithms, data validation and cleansing, duplicate removal, or temporal filtering to remove undesired source data. In some embodiments, administrator may define filtering criteria, processor 204 may iterate through source data, apply filtering rules, and remove undesired source data. Further, processor 204 may employ optimization techniques, feedback, and iteration to adjust models and algorithms, enhance efficiency, and improve processing time.

Processor 204, in some embodiments, may be configured to extract information from data. For example, processor 204 may extract a plurality of keywords from the source data. Keywords refer to words or phrases that are significant according to a predefined criteria (e.g., from administrator) or other determination (e.g., AI or machine learning algorithm). Keywords comprise at least one word and may provide general, comprehensive descriptions or explanations of particular ideas, data, concepts, information, or topics. For example, keywords may refer to a word, series of words, phrase, sentence, paragraph, or all content of source data. For example, keywords may involve information regarding the application the user is having an issue with (e.g., Java Services) and the issue user is having (e.g., memory, configuration, authentication, connectivity, performance, compatibility, user permission issues). In some embodiments, extracting a plurality of keywords from the source data involves retrieving, filtering, isolating, selecting, or identifying information from a larger dataset, database, or source of information. For example, extracting keywords from source data may involve analyzing the text or content of data and identifying the most relevant terms that represent main topics or concepts or according to predefined criteria. Processor 204, in some embodiments, may extract keywords through frequency analysis, term frequency-inverse document frequency, N-gram analysis, part-of-speech tagging, named entity recognition, text summarization, keyword extraction libraries, graph-based methods, machine learning models, domain-specific dictionaries, or contextual analysis. Processor 204 may adjust parameters for extracting keywords based on the nature of the data, goals of the system, available resources, or administrator manipulation or input. Predefined criteria may refer to specific standards, rules, or conditions that are established. User, administrator, or software system (e.g., AI or machine learning algorithm) may determine and manipulate what predefined criteria determine a keyword. Non-limiting examples of predefined criteria include software name (e.g., Outlook, Jira) or type of issue (e.g., not working, malfunctioning). Further, predefined criteria may involve deciding if a keyword includes singular words or phrases. Processor 204, in some embodiments, may store data. For example, processor 204 may store data in registers, cache memory, main memory, storage devices, main memory, databases, or storage devices. In some embodiments, processor 204 may store the plurality of keywords in database 202 (e.g., as described below with respect to at least FIG. 4).

In some embodiments, processor 204 may perform logical operations, execute instructions, manipulate, process, and make determinations on data (e.g., source data). For example, processor 204 may be configured to compare data. In some embodiments, processor 204 may evaluate conditions, values, or outcomes based on predetermined algorithms, rules, or logic. Further, in some embodiments, processor 204 may make determinations based on the compared data. Comparing data refers to examining similarities and differences between datasets, data, or other information. In some embodiments, processor 204 may compare received user issue input to stored keywords. For example, comparing received user issue input to the stored keywords may involve examining keywords, evaluating similarities, contrasting differences, and making relative assessments of the received user issue input and stored keywords. As described elsewhere herein, the parameters and criteria of comparison (e.g., how to compare, what to compare, how comparison results are determined) may be determined by trained model 208, an artificial intelligence system, a machine learning system, or administrator. For example, with respect to the received user issue input and stored keywords, processor 204 may compare similarities of the words or phrases as well as differences of the words or phrases. Processor 204 may determine a comparison result, which refers to the outcome of the comparison of received user issue input to the stored keywords (e.g., as described below with respect to at least FIG. 4). For example, processor 204 may determine received user issue input and keywords in database 202 have similar words. The comparison result may include information that there are similarities between user issue input and keywords in database 202 as well as indicate what the similar words are. Comparison result may also include information that there were no similarities between user issue input and keywords in database 202. Matches refers to similarities between two or more items or concepts. For example, a word included in received user issue input (e.g., Java) may match a word in stored keywords (e.g., Java), meaning the words are the same. Alternatively, or in addition, a phrase in received user issue input (e.g., Java services) may match a phrase in stored keywords (e.g., Java services), meaning the phrases are the same. Processor 204 may also recognize similar meanings of words or phrases. For example, if two compared words or phrases are not explicitly the same, but have the same or similar meanings, processor 204 may determine they match. By way of non-limiting example, processor 204 may determine, based on a comparison of the received user issue input to the stored keywords, whether the received user issue input matches the keywords in database 202 (e.g., as described below with respect to at least FIG. 4).

Data sources 206 refer to any system, device, or application that produces or provides data. Further, in some embodiments, data sources 206 may collect, generate, acquire, or store data. Data sources 206 may involve internal and external sources, structured and unstructured data, real-time or historical data. Non-limiting examples of data sources include databases, data warehouses, sensors, web services, files, images, Application Programming Interfaces (APIs), or any other repository that produces or provides data. The data the data sources 206 produce or provide may be referred to as source data. In some embodiments, data sources 206 include one or more of mail data, ticket data, project management data, or incident report data. Mail data refers to information, content, or messages sent or received through an email system or messaging platform. For example, mail data may include extracted and interpreted content of email messages (e.g., sender information, recipient details, subject lines, body content), format and composition information of email messages (e.g., HTML formatting), and authentication and security information of email messages. Processor 204, in some embodiments, may receive mail data from data sources 206. Ticket data refers to information, content, or messages involving customer inquiries, or support requests. For example, ticket data may include ticket creation and management information, automated ticket routing information, ticket status tracking information, ticket reporting, and ticket analytic information. Further, ticket data may include customer support tickets, service tickets, or technical support tickets. In some embodiments, ticket data may involve an issue with software deployment (e.g., a bug, a non-working feature, or a problem with a feature of the software deployment) inputted by user. Processor 204, in some embodiments, receive ticket data from data sources 206. Project management data refers to information, metrics, or statistics related to planning, executing, or monitoring a software project. For example, project management data may include task and issue tracking data, time and resource allocation data, quality assurance and testing data, version control and code repository data, or team collaboration and communication data. Processor 204, in some embodiments, receives project management data from data sources 206. Incident report data refers to information and documentation related to specific incidents, accidents, or events that occur. For example, incident report data may include a detailed account of circumstances, causes, or issues related to an incident as well as actions taken to address the incident. Processor 204, in some embodiments, may receive incident report data from data sources 206. In some embodiments, mail data, ticket data, project management data, or incident report data include information from Rally, Outlook, ServiceNow, Jira, or API. Data sources (e.g., mail data, ticket data, project management data, and/or incident report data) may be received, sent, or updated at any stage of the system or method for troubleshooting issues.

Data sources 206 may be configured to communicate with applications, devices, systems, or applications. For example, processor 204 may receive source data from data sources 206 (e.g., as described below with respect to at least FIG. 4). Data sources 206 may send data via files, databases, network, internet, Internet of Things (IoT) devices, or any other means of sending data. Data sources 206, in some embodiments, produce, provide, or send information to processor 204. Further, in some embodiments, data sources 206 are synced with one or more cloud systems or software communication systems. Synced refers to ensuring data in multiple locations or multiple systems are up to date and consistent. For example, two devices may be synced if they store the same files and information. Syncing may involve ensuring compatibility with or regular updates with multiple devices. Cloud systems refer to infrastructure, platforms, and software applications delivered over the internet. Cloud systems may enable users 102 to access, store, and manage data and applications remotely. Cloud systems may include infrastructure as a service model (IaaS), platform as a service (PaaS), or software as a service (Saas). In some embodiments, cloud systems are a public cloud, a private cloud, or a hybrid cloud. Data sources 206, in some embodiments, are synced with one or more cloud systems. Software communication systems refer to software systems that facilitate communication and data exchange between devices, applications, and/or systems. For example, software communication systems may allow for transmission of data across networks or interconnected applications, systems, or platforms. Software communication systems may include APIs or unified communication systems. Data sources 206, in some embodiments, are synced with one or more software communication systems. Processor 204 may ensure data sources 206 are synced regularly at predefined times or synced automatically. For example, administrator may determine, manipulate, and edit what data sources 206 are synced and when. Data sources 206 may be synced to one or more cloud systems, one or more software communication systems, or synced to one or more cloud systems and one or more software communication systems. In some embodiments, data sources 206 include images. Images refer to visual representations of data or graphics. For example, images may refer to photographs, illustrations, diagrams, and graphical designs. Images may be stored in various file formats such as JPEG, PNG, GIF, TIFF, and BMP. Image source data refers to source data, as described and exemplified elsewhere herein, from images. For example, processor 204 may extract image source data from data sources 206. Processor 206 may be configured for parsing and retrieving image source data, filtering and selecting relevant data based on predetermined parameters or conditions, or transforming data into a usable format for a particular purpose (e.g., analysis, visualization, or storage). Extracted image source data may include resolution information for issues.

In some embodiments, processor 204 may be configured to communicate with, send information to, or receive information from a cognitive vision tool. For example, processor 204 may extract image source data with a cognitive vision tool to analyze, retrieve, and interpret information from images. Extracting image source data, in some embodiments, involves retrieving, filtering, isolating, selecting, or identifying image source data from images. For example, a cognitive vision tool may be used to extract image source data from images. A cognitive vision tool refers to a software tool, system, or systems that use artificial intelligence (AI) or machine learning to enable systems or devices to interpret and understand visual information (e.g., images). A cognitive vision tool may involve image recognition and classification, object detection and tracking, scene understanding and context awareness, visual search and analysis. For example, the cognitive vision tool may acquire visual data such as images and video frames and the acquired data may be sent to the processor 204. Acquired data may be transmitted to the processor 204 (e.g., within a device or across a network). In some embodiments, processor 204 extracts image source data with a cognitive vision tool, which involves image recognition, object detection, feature extraction, or data interpretation. Processor 204, in some embodiments, execute cognitive vision algorithms, which may be part of the cognitive vision tool. The cognitive vision algorithms extract meaningful information from the images. Further, the cognitive vision algorithms may identify and extract relevant features from the visual data such as shapes, colors, patterns, or textures, which helps processor 204 understand image content. Processor 204, in some embodiments, may use machine learning models to make inferences about the extracted image source data. The machine learning models may have been trained on large datasets to recognize patterns and make predictions or decisions based on the extracted image features. The processor 204 or cognitive vision tool may generate a cognitive vision output based on the images. The cognitive vision output may include information about detected objects, their locations, or any other relevant information. The cognitive vision tool, in some embodiments, may include a feedback loop based on new data or administrator feedback to improve the machine learning algorithm. Further, the cognitive vision output may trigger a response or action, such as sending information to processor 204 for cognitive vision output to be stored (e.g., in database 202).

Database 202, in some embodiments, is a collection of data. Database 202 may be a relational database, a nonrelational database, document stores, key-value stores, column-family stores, a graph database, an in-memory database, a time-series database, a newSQL database, a multimodal database, or an object-oriented database. Data stored in database 202 may be structured, semi-structured, or unstructured. Data stored in database 202 may encompass many types of information including text, numbers, or multimedia. Data in database 202, in some embodiments, may be stored using tables, indexes, data files, or data models. Database 202 may allow users, administrator, processor, systems, or applications to send, store, access, process, retrieve, receive, and manipulate data inside database 202. Data in database 202 may be stored indefinitely or for a period of time. Database 202 may be compatible with various operating systems, software systems, applications, hardware platforms, network environments, management systems, web-based applications, enterprise systems, embedded systems, or trained learning models. For example, database 202 may communicate with processor 204 via SQL database management system. Using SQL database management system, application running on processor 204 may make a request to database 202, generate SQL statements based on requested database operations, establish a connection to database 202, send SQL statements for execution, and retrieve or manipulate data based on SQL statements.

In some embodiments, database 202 may be configured to receive and send data, information, commands, signals, instructions from processor 204, data sources 206, trained model 208, or chatbot 106. For example, database 202 may receive and store keywords from processor 204. In some embodiments, database 202 may store keywords from processor 204. Database 202, in some embodiments, may receive keywords from processor 204. Database 202 may also send keywords to processor 204. Further, database may send and receive data from trained model 208, such as keywords, comparison result, or trained model outputs.

Trained model 208, in some embodiments, may be a machine learning model that has undergone a process of learning and optimization using a dataset to perform specific tasks such as classification, regression, or pattern recognition. Trained model 208 may be hardware or software. Trained model 208 may be implemented as part of processor 204 or not be implemented as part of the processor 204 (e.g., on-chip or off-chip). Trained model 208 may involve embedded systems, ASICs, FPGAs, CPUs, GPUs, or distributed systems. Trained model 208, in some embodiments, may be implemented and deployed in various computing platforms such as computer systems, servers, cloud infrastructure, and other hardware devices.

Trained model 208, in some embodiments, may be trained to learn patterns, relationships, and rules to make predictions, classifications or other decisions. Trained model 208 may involve collecting data, preprocessing data, selecting an appropriate model (e.g., machine learning algorithm or model architecture) based on the nature of the problem or characteristics of the dataset, feeding a dataset into the chosen model and using an optimization algorithm to adjust the model's internal parameters evaluating the performance of the model on a separate validation dataset to assess accuracy, tuning the model to improve performance, and testing. Trained model 208 may adjust its internal parameters and algorithms to minimize errors or discrepancies between its predictions and actual outcomes or feedback. Trained model 208 may involve structured machine learning, unstructured machine learning, or reinforcement machine learning. Training the trained model 208 may be iterative and involve techniques such as gradient descent, backpropagation, or other optimization algorithms to improve the trained model's 208 efficiency. In some embodiments, trained model 208 may be based on a previous pair of user issue inputs. A previous pair of user issue inputs, in some embodiments, refers to user issue inputs previously inputted into chatbot 106 or system. A previous pair of user issue inputs mapped to resolutions, in some embodiments, refers to the trained model 208 being trained according to a previous pair of user issue inputs (e.g., historical resolution data). Resolutions refers to solutions of issues (e.g., solutions of user issue inputs). For example, resolutions may be based on programed solutions, historical resolutions, machine learning algorithms, artificial intelligence, or trained learning models.

Processor 204 may be configured to map (e.g., associate, link) data so processor 204 can efficiently access, manipulate, and process data. Further, associated or linked data elements may be mapped to each other for purposes of data integration, transformation, or synchronization. Mapping data may involve establishing connections or relationships between different data structures or formats for the exchange or conversion of information. For example, in some embodiments, trained model 208 may map user issue inputs to resolutions and the comparison result. Trained model 208, in some embodiments, may map at least one of a project name or keywords to a category. Project name refers to a designated title or identifier assigned to a user input issue. For example, project name may involve the issue, problem description, objective, or intended outcomes of the project. Category refers to a classification or grouping used to organize and manage types of data, information, or resources within the system. For example, category may be used to relate issues, keywords, or resolutions based on common attributes, characteristics or criteria.

Trained model 208, in some embodiments, may reference historical resolution data, to understand previous troubleshooting strategies and outcomes used to handle similar issues. Historical resolution data refers to information or data that documents the outcome or solution of past issues or problems. Further, historical resolution data may provide valuable insights into the patterns, trends, and successful strategies that have been employed to resolve issues. Trained model 208 may also reference historical resolution data to identify patterns or correlations that may be used to predict future events or behaviors. By analyzing and using historical resolution data, processor 204 may make more accurate predictions or informed decisions based on past issue resolution trends and patterns. Further, historical resolution data may be used to improve predictive analytics and decision-making of system.

In some embodiments, the previous pair of user issue inputs mapped to resolutions may be sorted according to at least one of a sorting metric, user feedback, or manual sorting. Sorting metric refers to criteria used to organize and arrange data elements in a particular way or order. For example, sorting metric may involve alphabetical sorting, numerical sorting, or custom sorting. User feedback refers to information provided by or manipulations by the user. For example, chatbot 106 may ask user 102 which resolution resolved the user-issue input, and the feedback from user 102 may be used to train the trained model 208. Further, administrator may manually map user issue inputs to resolutions, override existing or automatic mapping, or set predetermined conditions for mapping. Manual sorting refers to software allowing user to manually organize, rearrange, or prioritize data elements or information according to preferences or criteria. Trained model 208 may be further configured to rank resolutions mapped to user issue inputs based on user feedback. For example, if 85% of users provided feedback that a resolution resolved a particular user issue input, that resolution may be ranked as the best resolution to solve its associated user issue input. The next time that particular user issue input is inputted into chatbot 106, the highest ranking associated resolution may be listed and displayed first in the chatbot 106. Trained model 208 may make predictions, classifications, decisions, recommendations, perform tasks, and generate information based on new data inputted into or stored in the trained model 208.

In some embodiments, an administrator manipulates and trains the trained model 208 through a user interface. The user interface refers to a point of interaction between an administrator and the system 200. In some embodiments, the user interface is configured to communicate with the processor 204 or trained model 208. The user interface may be a graphical user interface (GUI), touchscreen interface, web interface, voice user interface (VUI), or any other system or method a user can interact with the system 200. For example, the user interface may be configured so that the administrator can configure or select a project (e.g., integrated payables, retail digital payments). Once a project (e.g., integrated payables, retail digital payments) has been selected, the administrator may add, delete, or manipulate category names (e.g., configuration issue, environment issue, third party service issue, database fix, process kill, services issue, disk space issue, coding issue, information) using the user interface. The category relates to the issue the user is having, as described elsewhere herein. In some embodiments, each category is assigned a unique identifier number. Further, the administrator may configure a data source (e.g., Rally) and add keywords (e.g., env, Java, page counts, PDF, print, environment, postal cleanse, server, import) in the user interface. The entry of keywords is important to the supervised machine learning model, as described below with respect to at least the supervised machine learning algorithm. It is to be appreciated the administrator can add, edit, manipulate, or delete any of the aforementioned entries (e.g., project, category, keywords) in the user interface.

In some embodiments, for a particular project (e.g., integrated payables), the administrator can select a data source 206 where the source data will be fed from. Non-limiting examples of data source 206 include Rally, Outlook, Jira, and CSV. In some embodiments, an endpoint and token are associated to the data source (e.g., Rally). The endpoint refers to a specific URL or URI, used for communication between software components or systems. The token is a piece of data that represents the authorization granted to a client. Stated another way, the token represents the authorization granted to access a specific resource. A cron expression may also be assigned in the user interface, for scheduling automated tasks. In some embodiments, a project (e.g., integrated payables, retail digital payments) contains multiple data sources 206 with associated endpoints and tokens.

In some embodiments, the user interface may display issue descriptions with associated issue resolutions and unique defect IDs. For example, the issue description may be mapped to an issue resolution and unique defect ID. Further, the administrator may select a machine learning engine to train. For example, the machine learning engine may be supervised, unsupervised, or reinforcement. Some examples of machine learning algorithms that may be utilized in embodiments of the present disclosure include linear regression, logistic regression, decision tree, Naïve Bayes, K-Nearest Neighbors (KNN), K-Means Clustering, and Random Forest algorithms. Additional algorithms relating to or having artificial intelligence and machine learning abilities may be utilized to resolve the user issue input issues. In some embodiments, language-agnostic algorithms may be implemented in any programming language with variables, arrays, and reserved keywords, such as Python or C #. It is to be appreciated that the prediction algorithms listed are non-limiting and that any machine learning algorithms may be used to generate the desired output.

Supervised machine learning refers to an algorithm that is trained on a labeled dataset. For example, under supervised machine learning, input data used during training is paired a corresponding output. With supervised machine learning, inputs are mapped to outputs. The algorithm makes predictions or decisions when given new data, based on the mapping. For supervised machine learning, in some embodiments, regression algorithms such as random forest may be used to make those predictions.

Unsupervised machine learning refers to an algorithm that is given unlabeled data and must find patterns, relationships, and structures within the data on its own. For unsupervised machine learning, in some embodiments, a clustering algorithm may be used. In contrast to supervised machine learning, unsupervised machine learning has no predefined output labels associated with input data.

Reinforcement machine learning implements both structured and unstructured machine learning. For example, with reinforcement machine learning, supervised algorithms may first check to see if keywords are associated with the user input. If no keywords associate with the user input, unsupervised algorithms may be used. The administrator may view the mapped information (e.g., issues, resolutions), add new information, update information, reorganize the information, and remove information in the user interface. For reinforcement machine learning, in some embodiments, results from the supervised machine learning and unsupervised machine learning algorithms may be combined to receive a desired output. Various systems, programs, and applications may be used to integrate the supervised machine learning and unsupervised machine learning algorithms, including, for example, the known TorchSharp library. The user interface, in some embodiments, shows issues and resolutions segregated by user category (e.g., configuration issue, information, process kill).

In some embodiments, supervised learning, unsupervised learning, and reinforcement learning algorithms may be used in mixed mode. For example, supervised learning, unsupervised learning, and reinforcement learning algorithms may be combined or integrated within a single system or application. Mixed mode allows each type of learning algorithm to address different parts of the problem to be resolved. In some embodiments, different learning algorithms may be working in parallel or in conjunction. For example, a transfer learning model may be used which leverages knowledge gained from one task to improve performance on another related task. Further, reinforcement learning with supervised learning components may be used to integrate elements of supervised learning to guide the decision making process of reinforcement learning. By combining the strengths of multiple models, more effective and robust models may be developed.

Trained model 208 may send and receive information. For example, trained model 208 may receive user issue input and comparison result from processor 204 and send trained model output information to processor 204. Further, trained model 208 may send and receive information to database 202, such as the comparison result, keywords, or any trained model output. Trained model output refers to any data, command, instructions, or information from the trained model 208. For example, trained model output may include resolutions or information regarding how the trained model was trained. Trained model output may involve source data information or information from processor 204. Trained model 208, may also send and receive information to chatbot 106, for example resolution, user issue input, feedback, or any other trained model output. As explained elsewhere herein (e.g., with respect to at least FIG. 4), trained model 208 may, in some embodiments, be based on a previous pair of user issue inputs mapped to resolutions and the comparison result. Processor 204, in response to the determining, may transmit the resolution from the trained model 208 to the chatbot 106 (as explained elsewhere herein with respect to at least FIG. 4).

Figure 3:
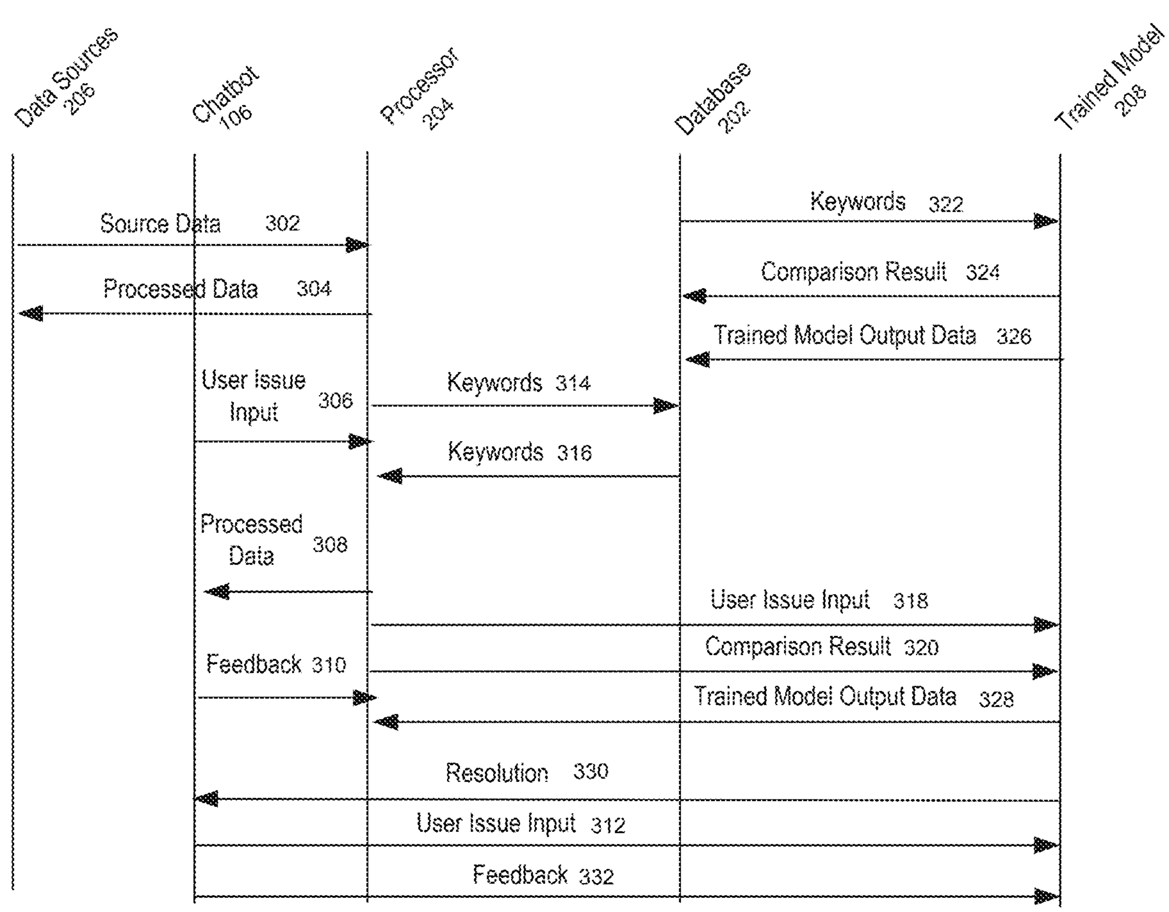
FIG. 3 depicts an exemplary data flow diagram for troubleshooting issues based on historical resolution data, consistent with disclosed embodiments.

FIG. 3 depicts an exemplary data flow 300. Data flow 300 comprises data sources 206, processor 204, database 202, trained model 208, and chatbot 106. Data sources 206, in some embodiments, sends source data to processor 204 in step 302. Source data may include mail data, ticket data, project management data, or incident report data. The source data may be updated at predetermined times, automatically, or in response to another action or trigger. In some embodiments, processor 204 may send processed data to data sources 206 in step 304. Processed data includes data the processor 204 outputs, such as filtered data, instructions, or commands. Processor 204, in some embodiments, retrieves a user issue input from chatbot 106 in step 306. The user issue input may include problem descriptions, issues, feature requests, or suggestions for improvement. The user issue input may be in natural language. Further, processor 204 may extract a plurality of keywords from source data. Processor 204, in some embodiments, may send the plurality of keywords to the database 202 for storage in step 314. The data in the database 202 may be stored for a period of time or indefinitely. The processor 204 may update, delete, access, or manipulate data stored in the database 202 at any time. For example, the processor 204 may access database 202 to see if user issue input matches keywords. Database 202, in some embodiments, sends keyword information to processor 204 in step 316. Processor 204 may determine a comparison result, in part due to the keywords in the database 202. Chatbot 106, in some embodiments, sends the user issue input to the processor 204 in step 306. Processor 204 may determine a comparison result based on keywords in database 202 and user issue input from chatbot 106. Processor 204, in some embodiments, sends the processed data to the chatbot 106 in step 308. Processed data may include instructions, commands, resolutions, feedback inquiries, or any other information. Chatbot 106 may also send user issue input to trained model 208 in step 312. User issue input may be in natural-language.

Trained model 208, in some embodiments, may be a machine learning model that has undergone a process of learning and optimization using a dataset to perform specific tasks such as classification, regression, or pattern recognition. Chatbot 106, in some embodiments, sends user feedback to processor 204 in step 310 or to trained model 208 in step 332. Feedback may be used to train the trained model 206. Processor 204 may input the user issue input into trained model 208 in step 318 or the comparison result into trained model 208 in step 320, wherein trained model 208 is based on a previous pair of user issue inputs mapped to resolutions and the comparison result. Processor 204, in response to determining whether the received user input matches the keywords in database 202, may transmit the resolution from the trained model 208 to chatbot 106 in step 330. Trained model 208, in some embodiments, sends the comparison result to database 202 in step 324. Further, trained model 208 may send trained model output data to database 202 in step 326. In some embodiments, the trained model 208 sends trained model output data to processor 204 in step 328. Trained model output data includes any data from the trained model 208, such as resolutions or information regarding how the trained model 208 was trained. In some embodiments, database 202 sends keywords to trained model 208 in step 322.

To provide an illustrative example of one implementation for generating and integrating machine learning models: in some embodiments, trained model 208 includes machine learning frameworks such as Microsoft's Machine Learning .NET programming language (ML.NET), which function to integrate machine learning models (e.g., supervised machine learning, unsupervised machine learning). In some embodiments, ML.NET is used with Visual Studio. For example, ML.NET may be a tool used with Visual Studio (e.g., Visual Studio 2022), which functions as a model builder to train and use machine learning algorithms. Stated another way, ML.NET refers to an open-source, cross-platform machine learning framework, which enables developers to build custom machine learning models and integrate them with applications (e.g., ML.NET applications). For example, in the Visual Studio project, a user may add machine learning model to an existing project.

In some embodiments, one or more algorithms may be selected to predict the machine learning scenario, such as data classification, value prediction, recommendation, forecasting, image classification, object detection, computer vision, natural language processing, text classification, or sentence similarity. In some embodiments, a training environment may be selected, such as a local CPU environment. In further embodiments, data may be added to the project from a local file or by connecting to a database (e.g., SQL Server database). The added data may help train the machine learning model. In some embodiments, an administrator may designate an amount of time to train the model (e.g., 60 seconds). It is to be appreciated that the amount of time to train the model may be dependent on a number of factors such as how large the dataset is. Once the model has been trained, training results may be displayed (listing e.g., best model, accuracy of best model, training time, models explored, generated code). Further, once the model has been trained, an administrator may test the model using a user interface. In some embodiments, the trained model consists of multiple files. For example, some files of the trained model may include model input and output classes and predict methods that can be used for model consumption. Another file may be the trained ML.NET model in the form of a serialized zip file. In some embodiments, yet another file may contain code to understand the importance of the input columns on model predictions. It is to be appreciated the file names listed above as well as functions of the files are non-limiting examples. Trained models may have other file names and configurations.

ML.NET may be used for supervised learning, unsupervised learning, and reinforcement learning. In some embodiments, ML.NET may be embedded with Microsoft Framework and apart from TorchSharp library. The TorchSharp library refers to a ML.NET library that provides access to the library that powers PyTorch. TorchSharp is derived based on PyTorch Python language wrapper for the ML.NET language. In some embodiments, the TorchSharp library is a C #language wrapper and may be used with Visual Studio to leverage machine learning capabilities. In some embodiments, the TorchSharp library uses tensor functionality for higher level code that creates a neural network. For example, the TorchSharp library may be involved in training the trained model 208 or deep neural network to classify text (e.g., user issue input). In some embodiments, the TorchSharp library has capabilities to use classification algorithms and other general purpose algorithms through the wrapper class to resolve recurring issues. PyTorch may be an alternative to TorchSharp and be used interchangeably based on the programming language used. It is to be appreciated TorchSharp is an example library used to train the model. Other libraries may be used to train the models.

Figure 5:
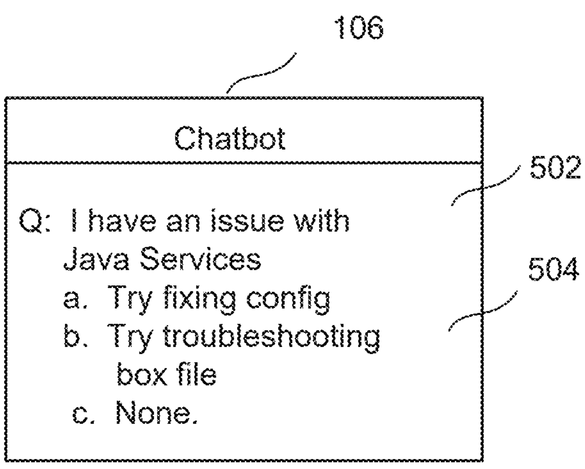
FIG. 5 depicts an exemplary user interface of a chatbot, consistent with disclosed embodiments.

By way of non-limiting example, in FIG. 5, chatbot 106 may receive a natural-language user issue input 502 from user 102 (e.g., "I have an issue with Java services"). User issue input 502, in some embodiments, involves problem descriptions, questions, suggestions, or feedback. Chatbot 106 may display the user issue input 502. In some embodiments, processor 204 receives the user issue input from the chatbot 106. The processor 204 may determine, based on a comparison of the received user issue input 502 to stored keywords, whether the received user issue input 502 matches the keywords in database 202. Processor 204, in some embodiments, determines if the user issue input 502 matches the keywords using natural-language processing or machine learning algorithms. In some embodiments, the processor 204 sends a comparison result and the user issue input to the trained model 208, where the trained model 208 outputs a resolution. The trained model 208 may send the resolution to the chatbot 106, where the chatbot 106 displays the resolution 504 (e.g., "a. Try fixing config b. Try troubleshooting box file c. None").

Figure 4:
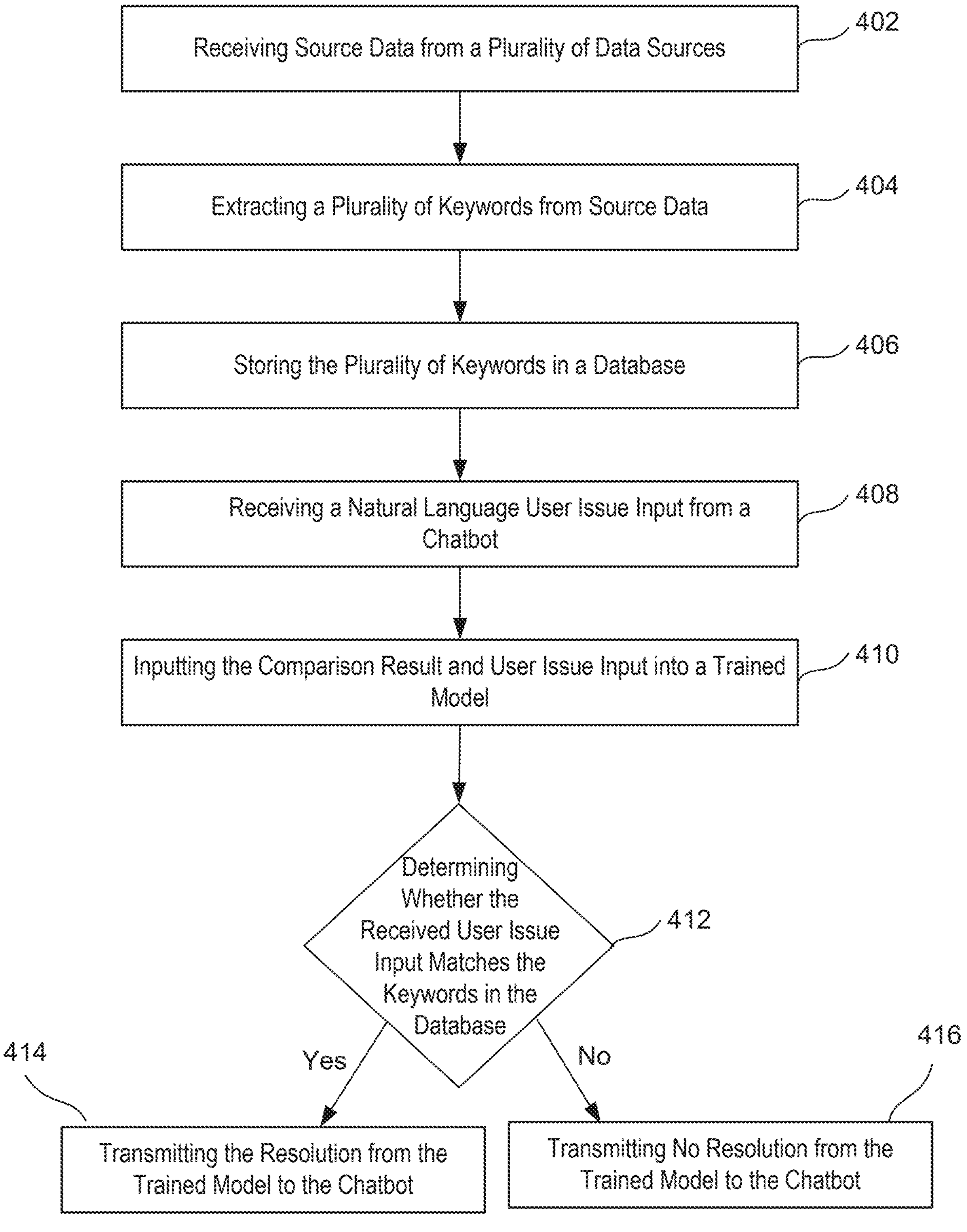
FIG. 4 depicts a flowchart of a first exemplary method for troubleshooting issues based on historical resolution data, consistent with disclosed embodiments.

FIG. 4 is an exemplary method for troubleshooting issues, based on historical resolution data. Method 400 comprises: receiving source data from a plurality of data sources 206 in step 402, extracting a plurality of keywords from source data in step 404, storing the plurality of keywords in database 202 in step 406, receiving a natural-language user issue input from chatbot 106 in step 408, inputting the user issue input into trained model 208 in step 410, determining whether the received user issue input matches the keywords in database 202 in step 412, and transmitting resolution from trained model 208 to chatbot 106 in step 414 or transmitting no resolution from trained model 208 to chatbot 106 in step 416.

In step 402, the processor 204 receives source data from a plurality of data sources 206. Data sources 206 include various systems, devices, or external services that generate or store data. Examples of data sources 206 include databases, sensors, external APIs, user input, and other applications. Source data from data sources 206 may be transmitted to the processor 204 through various communication channels such as direct connection (e.g., network, bus), network communication (e.g., TCP/IP or HTTP), or input/output ports. Further, source data from data sources 206 may be in various data formats such as JSON, XML, CSV, or binary formats. In some embodiments, the processor 204 has a mechanism to ingest or receive incoming data such as input channels, data buffers, or dedicated input interfaces. In some embodiments, middleware or integration software are used to facilitate communication between data sources 206 and the processor 204. Further, middleware or integration software may involve data translation, data consolidation, data transformation, data loading, real-time processing, batch processing, automation, or protocol conversion. In some embodiments, data sources 206 send source data to processor 204 via files, network, internet, Internet of Things (IoT) devices, or any other means of sending data. Data sources 206, in some embodiments, are synced with one or more cloud systems or software communication systems. Processor 204, in some embodiments, uses streaming protocols to continuously receive and process data as it comes available.

In step 404, processor 204 extracts a plurality of keywords from source data. Processor 204 may extract a plurality of keywords in a number of ways including natural language processing (e.g., tokenization, part-of-speech tagging, named entity recognition, stemming, or lemmatization), term frequency-inverse document frequency keyword extraction algorithms (e.g., rapid automatic keyword extraction, textrank), machine learning models, statistical analysis, frequency analysis, topic modeling, keyword libraries and dictionaries, user feedback, or contextual analysis. In other embodiments, the processor 204 extracts keywords from source data for content summarization, search engine optimization, information retrieval, document categorization, tagging, data analysis, data visualization, content recommendation, social media monitoring, topic modeling, text mining, or data mining.

In step 406, processor 204 stores the plurality of keywords in database 202. Database 202 refers to a structured collection of data that is organized and stored in a way that allows for efficient retrieval, management, and updating of information. In some embodiments, storing the plurality of keywords in database 202 involves designing a database schema that includes one or more tables for storing keywords, creating a mapping table that links source data to keywords, defining table fields, normalizing the database 202 to reduce duplication and dependency, indexing data, selecting a database management system (e.g., MySQL, PostgreSQL, MongoDB), implementing mechanisms to insert keywords into the database 202, developing queries or APIs to retrieve keywords based on specific criteria, and updating data regularly. Mechanisms to insert keywords into database 202 may involve direct insertion, indexing, tagging, natural-language processing, bulk insertion, scripts, APIs, data entry forms, collaborative tagging, machine learning, automation, or customized algorithms.

In step 408, processor 204 receives a natural-language user issue input from chatbot 106. Natural-language user issue input may refer to an input from the user 102 in human language. Processor 204 may use natural-language processing which allows systems to understand, interpret, and respond to human language. In some embodiments, the chatbot 106 serves as a conversational interface that allows users 102 to interact with a processor 204 using natural language. Chatbot 106, in some embodiments, receives the user issue input from the user 102 via user device 104. By way of non-limiting example, in some embodiments, processor 204 receives a natural-language user issue input (e.g., text, voice, other modalities) from chatbot 106, the chatbot 106 processes the user issue input, the processor 204 analyzes user issue input to understand its meaning (e.g., using natural language processing), the chatbot 106 maintains context from the ongoing conversation (e.g., remembering previous user issue inputs and resolutions), the processor 204 executes logic based on the user input, and the processor 204 generates a response associated with the user issue input and context of the conversation (e.g., text, voice, or other modalities).

In step 410, processor 204 inputs the user issue input into the trained model 208. Trained model 208 refers to a machine learning model that has undergone a training process, using a set of input data to learn patterns, relationships, and features within data. It is to be appreciated the trained model 208 having undergone a training process is an example of supervised learning. In other embodiments, the processor 204 uses unsupervised and reinforcement models to gain insights from the user issue input. In some embodiments, the trained model 208 may be based on the user issue input and the comparison result. The processor 204 inputting the user issue input into the trained model 208, in some embodiments, involves data preprocessing (e.g., scaling, normalization), feature extraction (e.g., extracting keywords), data formatting (e.g., structuring data shape, size, types), model integration (e.g., via remote server, cloud service), and applying learned patterns and relationships to generate a trained model output (e.g., resolutions). The trained model output, in some embodiments, may represent the trained model's prediction or inference based on the input data. Processor 204 may use, store, or further process the trained model output.

In step 412, processor 204 determines whether the received user issue input matches the keywords in the database 202. Determining whether the received user issue input matches the keywords in the database 202, in some embodiments, involves field-by-field comparison, key-based matching, fuzzy matching, pattern matching, sorting, advanced matching algorithms, string matching, machine learning classification, database query, contextual matching, or user-defined rules. Further, determining whether the received user issue input matches the keywords in the database 202 may depend on criteria such as the nature of the data, task of the system, and desired level of precision. In some embodiments, the outcome of the determination is the comparison result. The comparison result may be sent from the processor 204 to the trained model 208. In some embodiments, the processor 204 determines that the received user issue input matches the keywords in the database 202. The determination that the received user issue input matches the keywords in the database 202 may prompt the trained model 208 to output resolutions, as described below with respect to at least step 414. In other embodiments, the processor 204 determines the received user issue input does not match keywords in the database 202. The determination that the received user issue input does not match keywords in the database 202 may prompt the trained model 208 to produce a signal indicating no matches were found, as described below with respect to at least step 416.

In step 414, the processor 204 determined the received user issue input matches the keywords in the database 202. In some embodiments, the processor 204 outputs the resolutions associated with the user issue input. Resolutions refer to solutions of user issue inputs. For example, resolutions may be based on programmed solutions, historical resolutions, machine learning algorithms, artificial intelligence, or trained learning models. In some embodiments, the resolutions are transmitted from the trained model 208 to the chatbot 106. For example, the processor 204 transmit the resolution from the trained model 208 to the chatbot 106 using communication channels. In some embodiments, the processor 204 establishes a connection channel with the chatbot 106, involving network protocols, APIs, or other communication mechanisms. In some embodiments, the processor 204 converts or transforms data into a structure compatible with the chatbot 106 (e.g., JSON, XML). In some embodiments, the processor 204 uses API calls to transmit data, which includes sending HTTP requests or using other API communication methods to interact with chatbot 106. Processor 204, in some embodiments, may send the formatted data (e.g., HTTP request, WebSocket message) to chatbot 106.

In step 416, the processor 204 determined the received user issue input does not match the keywords in the database 202. In some embodiments, the processor 204 transmits an indication of no resolution from the trained model 208 to the chatbot 106. For example, the trained model 208 may output an error message or signal that no resolutions have been found related to the user issue input. Transmitting the no resolution from the trained model 208 to the chatbot 106 may involve communication channels, HTTP requests, WebSockets, Message Queuing Telemetry Transport, direct integration, message queues, GraphQL, file uploads, or other means of sending information. For example, processor 204 may establish a connection channel with the chatbot 106, involving network protocols, APIs, or other communication mechanisms. Processor 204 may convert or transform data into a structure the chatbot 106 understands (e.g., JSON, XML). In some embodiments, processor 204 may use API calls to transmit data, which includes sending HTTP requests or using other API communication methods to interact with chatbot 106. Processor 204 may send the formatted data (e.g., HTTP request, WebSocket message) to chatbot 106. Processor 204 or trained model 208, in some embodiments, sends inquiries to chatbot 106 for user 102 to clarify the user issue input. In some embodiments, the trained model 208 sends suggested corrections to the previous user issue input that would result in resolutions. Additionally or alternatively, the trained model 208 may also send recommended user issue inputs or popular user issue inputs to chatbot 106. User 102 may respond to the suggestions or inquires and the processor 204 or trained model 208 may adjust accordingly. In some embodiments, trained model 208 may send a signal to processor 204 to update data sources 206, search data sources 206 for related information, or perform a refined search of database 202. Additionally or alternatively, processor 204 may train the model based on the user issue input with no resolution. For example, in some embodiments, new rules will be created based on the user issue input with no resolution. In other embodiments, the trained model 208 will be trained based on the new data, learning patterns, structures, and relationships.

Figure 6:
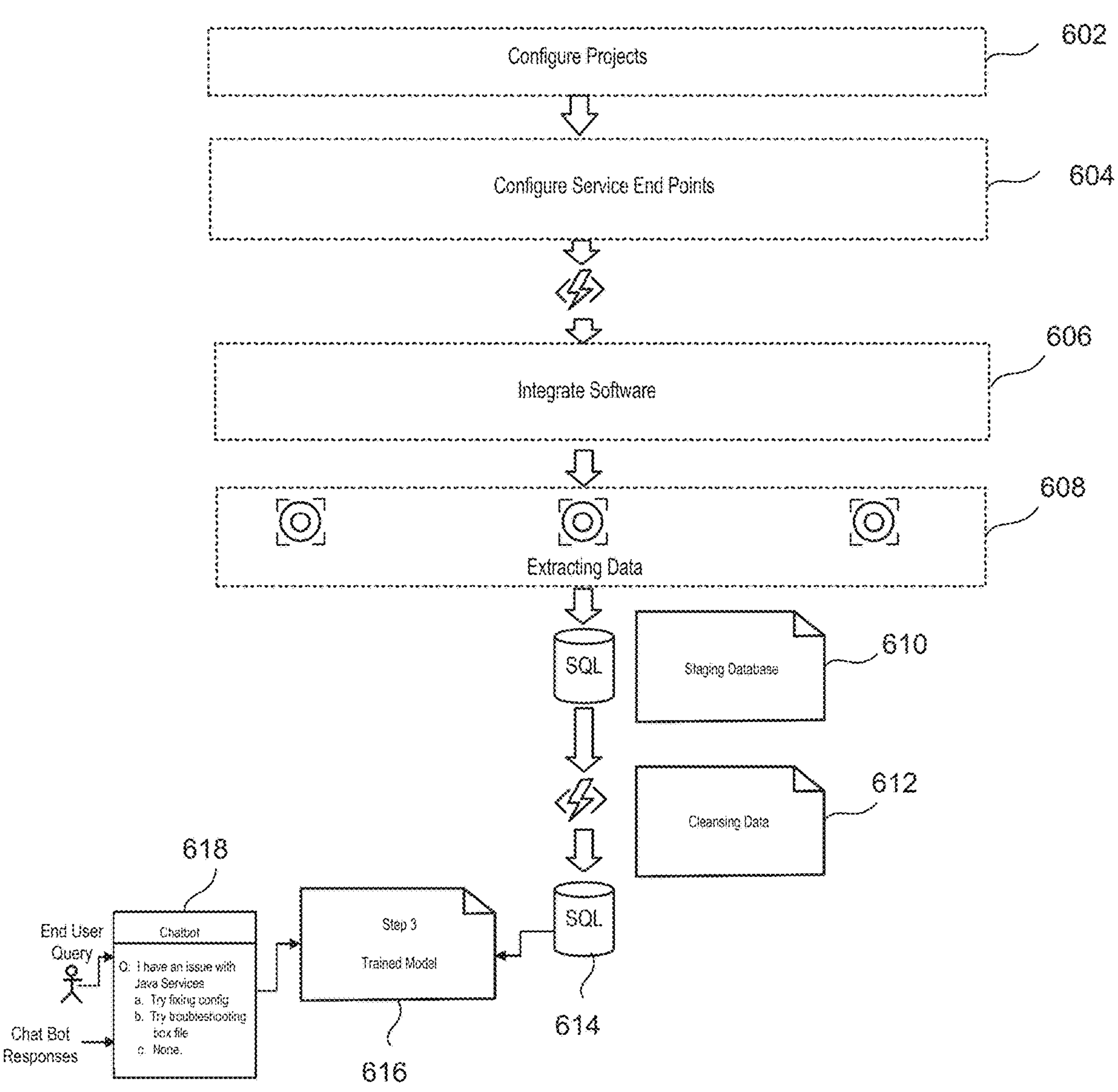
FIG. 6 depicts a flowchart of a second exemplary method for troubleshooting issues based on historical resolution data, consistent with disclosed embodiments.

FIG. 6 depicts a second exemplary method 600 for troubleshooting issues based on historical resolution data including a staging database and main production database. Method 600 comprises configuring projects in step 602, configuring service endpoints in step 604, integrating software in step 606, extracting data in step 608, ingesting data into a staging database in step 610, cleansing data in step 612, ingesting data into a main production database in step 614, inputting data into a trained model 208 in step 616, and receiving and sending data to chatbot 106 in step 618.

In step 602, the processor 204 configures projects by storing project information (e.g., project ID). Projects refer to planned and organized efforts to achieve a specific goal. In some embodiments, the user issue input is related to a project. For example, the user 102 may be working on a project and runs into an issue. In some embodiments, project information includes a goal's scope, objectives, requirements, team, plans, design, architecture, development, or any other related information. Project configuration files may be stored in various file formats such as JSON, YAML, XML, INI. For example, a project's name may involve the issue, problem description, objective, or intended outcomes of the project. In some embodiments, projects 602 are defined by users, administrators, teams, the processor 204, or any other person or component. In some embodiments, configuring projects 602 includes modifying configuration files and setting parameters for projects (e.g., objectives, intended outcomes) For example, in some embodiments, projects 602 include configuration files, source code, documentation, or other scripts. Projects 602 may be stored in version control systems (VCS), online repository hosting platforms, file systems, document management systems, project management software, cloud storage services, database systems, integrated development environments (IDEs), wiki systems, project management tools, container registries, or any other means of storing information. In some embodiments, step 602 includes mapping project configurations to data sources 206 (e.g., Rally, Jira).

In step 604, the processor 204 configures service end points. Service end points refer to specific network addresses or URLs through which services can be accessed or communicated with. In some embodiments, service end points are interfaces or entry points that allow applications, services, or components to interact with a service. For example, a service end point may consist of a network address (e.g., IP address, domain name), be represented as URIs, and be accessed over HTTP protocol.

Configuring service end points 604 refers to defining and modifying endpoints (e.g., network addresses, URLs) through configuration settings. In some embodiments, configuring service end points 604 includes changing configuration settings for different environments such as distributed systems, microservice architectures, and cloud-based applications. In some embodiments, API management platforms are used to configure and control service end points. In some embodiments, remote configuration servers help manage configurations, including service end points 604. Configuring service end points 604 provides flexibility and adaptability to changing environments. In some embodiments, configuring dynamic end points enables dynamic configuration, external service integration (e.g., APIs, microservice), environmental adaptability, third-party service connection, cloud services integration, service discovery, versioning, updating, monitoring, and analytics.

In step 605, the processor 204 syncs and updates data from data sources. Syncing data with data sources ensures the system can dynamically adapt to changes in data sources without code modifications and can update information regularly. In some embodiments, syncing data sources involves implementing a mechanism for dynamically updating the configuration (e.g., through periodic checks, event-driven updates) or Application Programming Interfaces (API) gateway integration (e.g., dynamically adapting to changes in service endpoints). In some embodiments, updates are real-time updates, event-driven updates, scheduled updates, user-initiated updates, or administrator-initiated updates. In some embodiments, the processor 204 syncs and updates projects, configurable service end points, or any other information.

In step 606, the processor 204 may configure systems to allow different software applications to communicate with each other. For example, APIs may be configured to allow different software applications to communicate with each other. In some embodiments, the processor 204 configures the API to define the methods and data formats applications use to request and exchange information. In some embodiments, integrating software 606 such as APIs allow for communication between software components, data retrieval, data submission, functionality extension, service access, automation, standardization, security, platform independence, versioning, and upgrades. In some embodiments, integrating software 606 involves syncing software with configurable service endpoints 604, projects 602, and other data sources. Integrating software 606 may involve API, Graph API, NowAPI, or any similar software.

In step 608, the processor 204 extracts data from data sources 206. In one embodiment, extracting data 608 involves using a cognitive computer vision tool to extract data from images. For example, in some embodiments, the processor 204 communicates with a cognitive computer vision tool, extracting features from images such as relevant patterns, structures, or characterizations within images. Further, the cognitive computer vision tool may perform object detection and recognition, identifying and classifying objects within the images. In some embodiments, optical character recognition (OCR) is used to extract text information from images. The extracted output data may be in a structured format, such as a list of recognized objects, text, or other relevant information. Further, the extracted data may be integrated into various applications or systems such as databases, analytics platforms, or other downstream processes.

In step 610, the processor 204 collects source data or extracted data in a staging database. A staging database is an intermediate database used in the process of extracting, transforming, and loading data from data sources 206 to a destination, such as a trained model 208 in step 616. Stated another way, the staging database is a temporary storage area where source data is prepared, cleansed, and transformed before being sent to another destination, such as the trained model 208. In some embodiments, the staging database is a SQL database. The staging database can ensure data quality, optimize system performance, perform incremental loading, profile data, perform schema transformation, or merge data. As part of the staging process, the processor 204 may convert the source data to JSON format and store the JSON data in the staging database.

In step 612, the processor 204 cleanses the source data and sends the source data to a main production database 614. In some embodiments, cleansing the data 612 involves identifying and correcting errors, inconsistencies, and inaccuracies in data. In some embodiments, the processor 204 cleanses the data 612 by data profiling (e.g., analyzing the structure, content, and quality of the dataset), handling missing data (e.g., removing rows with missing values, imputing missing values based on statistical measures, predicting missing values based on machine learning algorithms), identifying and removing duplicates, standardizing data (e.g., converting text to be consistent, normalizing units of measurement), extracting relevant information, correcting inaccurate data (e.g., correcting typographical errors, validating data against reference data, updating data sources 206), establishing data validation rules (e.g., verifying data follows a valid format), cross-field validation (e.g., checking related fields are consistent), handling inconsistent formats (e.g., converting data to a common format), implementing data quality metrics (e.g., accuracy, timeliness, consistency), and implementing an iterative process. Cleansing the data 612 improves data quality, making the data more accurate, complete, and reliable. In some embodiments, the processor 204 implements tools and scripts to streamline data cleansing. A main production database 614 is a database that holds critical, operational, and real-time data for the system 600. In some embodiments, the main production database 614 is a main Cosmos production database or SQL database. Further, the main production database 614 can enable software applications, services, and processes to interact with and retrieve information.

In step 616, the processor 204 inputs the cleansed data from the main production database 614 into the trained model 208. In some embodiments, the trained model 208 in step 616 is a machine learning model that has undergone a process of learning and optimization using a dataset to perform specific tasks such as classification, regression, or pattern recognition. For example, the trained model 208 may be based on historical resolutions and user responses from the chatbot 106.

In step 618, the chatbot 106 receives user issue inputs, display user issue inputs, and communicate with the trained model 208. Chatbot 106, in some embodiments, enables communication between user 102 and processor 204. For example, chatbot 106 may be a chatbot or conversational agent designed to engage in natural-language conversations with user 102. The chatbot 106, in some embodiments, displays resolutions associated to user issue inputs from the trained model 208. In some embodiments, the chatbot 106 asks the user which resolution resolved their issue and subsequently, the chatbot 106 may provide feedback to the trained model 208.

This disclosure may be described in the general context of customized hardware capable of executing customized preloaded instructions such as, e.g., computer-executable instructions for performing program modules. Generally, program modules include routines, programs, objects, components, data structures, and so forth, which perform particular tasks or implement particular abstract data types. The disclosed embodiments may also be practiced in distributed computing environments where tasks are performed by remote processing devices that are linked through a communications network. In a distributed computing environment, program modules may be located in local and/or remote computer storage media including memory storage devices.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. Furthermore, non-transitory computer-readable media can contain instructions, that when executed by one or more processor, cause a computing system (e.g., a cloud computing platform, computing cluster, or the like) to implement the disclosed systems and methods. In addition, while certain components have been described as being coupled to one another, such components may be integrated with one another or distributed in any suitable fashion.

While illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system for troubleshooting issues based on historical resolution data comprising:

memory; and at least one processor, the memory containing software code configured to cause the processor to:

receive source data from a plurality of data sources according to a scheduler that triggers retrieval of the source data using service endpoints and authorization tokens;

extract a plurality of keywords from the source data;

ingest the source data into a staging database, cleanse and normalize the source data, ingest the normalized source data into a production database, and store the extracted plurality of keywords in the production database;

receive a natural-language user issue input from a chatbot;

determine, based on a comparison of the received user issue input to the stored keywords, whether the received user input matches the keywords in the database, wherein the comparison produces a comparison result that is provided to an executable inference artifact deployable for runtime consumption; and execute the executable inference artifact operating on normalized source data stored in the production database to generate at least one candidate resolution;

when the determination indicates no match, transmit an indication of no resolution and cause the chatbot to request clarification of the user issue input or provide suggested corrected inputs;

in response to the determination, transmit one resolution selected from the generated candidate resolution(s) to the chatbot;

receive feedback associated with a user-selected resolution generated during the chatbot interaction; and update and store a resolution-ranking data structure based on the received feedback, wherein a subsequent determination of the one resolution includes selecting the one resolution using the stored resolution-ranking data structure.

2. The system of claim 1, wherein the data sources comprise one or more of mail data, ticket data, project management data, incident report data.

3. The system of claim 1, wherein the data sources are synced with one or more cloud systems or software communication systems.

4. The system of claim 1, wherein at least one of the plurality of data sources comprises images;

the processor is further configured to extract image source data with a cognitive vision tool; and the processor is further configured to store the image source data in the database.

5. The system of claim 1, wherein the processor is further configured to convert the source data to JSON.

6. The system of claim 1, wherein the resolution ranking data structure is sorted according to at least one of a sorting metric, user feedback, or manual sorting.

7. The system of claim 1, wherein the executable inference artifact assigns category identifiers stored in the production database to candidate resolutions.

8. The system of claim 1, wherein:

the determining comprises determining that the received user input does not match at least a portion of the stored keywords; and in response to the determining, transmitting an indication of no resolution.

9. The system of claim 1, wherein:

the determining comprises determining that the received user input does match at least a portion of the stored keywords; and in response to the determining, transmitting the selected resolution.

10. The system of claim 1, wherein the processor is further configured to remove undesired source data.

11. A method for troubleshooting issues based on historical resolution data wherein the processor containing memory is configured to:

receive source data from a plurality of data sources according to a scheduler that triggers retrieval of the source data using service endpoints and authorization tokens;

extract a plurality of keywords from the source data;

ingest the source data into a staging database, cleanse and normalize the source data, ingest the normalized source data into a production database, and store the extracted plurality of keywords in the production database;

receive a natural-language user issue input from a chatbot;

determine, based on a comparison of the received user issue input to the stored keywords, whether the received user input matches the keywords in the database, wherein the comparison produces a comparison result that is provided to an executable inference artifact deployable for runtime consumption; and execute the executable inference artifact operating on normalized source data stored in the production database to generate at least one candidate resolution;

when the determination indicates no match, transmit an indication of no resolution and cause the chatbot to request clarification of the user issue input or provide suggested corrected inputs;

in response to the determination, transmit one resolution selected from the generated candidate resolution(s) to the chatbot;

receive feedback associated with a user-selected resolution generated during the chatbot interaction; and update and store a resolution-ranking data structure based on the received feedback, wherein a subsequent determination of the one resolution includes selecting the one resolution using the stored resolution-ranking data structure.

12. The method of claim 11, wherein the data sources comprise one or more of mail data, ticket data, project management data, incident report data.

13. The method of claim 11, wherein the data sources are synced with one or more cloud systems or software communication systems.

14. The method of claim 11, wherein at least one of the plurality of data sources comprises images;

the processor is further configured to extract image source data with a cognitive vision tool; and the processor is further configured to store the image source data in the database.

15. The method of claim 11, wherein the processor is further configured to convert the source data to JSON.

16. The method of claim 11, wherein the resolution ranking data structure is sorted according to at least one of a sorting metric, user feedback, or manual sorting.

17. The method of claim 11, wherein the executable inference artifact is configured to map at least one of a project name or the keywords to a category.

18. The method of claim 11, wherein:

the determining comprises determining that the received user input does not match at least a portion of the stored keywords; and in response to the determining, transmitting an indication of no resolution.

19. The method of claim 11, wherein:

the determining comprises determining that the received user input does match at least a portion of the stored keywords; and in response to the determining, transmitting the selected resolution.

20. The method of claim 11, wherein the processor is further configured to remove undesired source data.

* * * * *